United States Patent [19]
Chanteau

[11] Patent Number: 5,905,941
[45] Date of Patent: May 18, 1999

[54] TELEVISION SIGNAL CABLE DISTRIBUTION INSTALLATION

[75] Inventor: Pierre Chanteau, La Haye Malherbe, France

[73] Assignee: U.S. Philips Corporation, New York, N.Y.

[21] Appl. No.: 08/767,736

[22] Filed: Dec. 16, 1996

[30] Foreign Application Priority Data

Dec. 20, 1995 [FR] France .................................. 95 15177

[51] Int. Cl.⁶ .............................. H04N 7/20; H04N 7/10
[52] U.S. Cl. .................. 455/3.2; 348/6; 348/10; 455/6.2; 455/12.1; 455/272; 455/427
[58] Field of Search ............................. 348/6, 7, 12, 13, 348/8; 455/3.1, 3.2, 4–6, 5.1, 6.1, 6.2, 3.3, 131, 3.21, 295, 150, 102, 104, 127, 12.1, 427, 272, 296

[56] References Cited

U.S. PATENT DOCUMENTS

| | | | |
|---|---|---|---|
| 4,538,174 | 8/1985 | Gargini et al. ............................... | 348/7 |
| 4,805,014 | 2/1989 | Sahara et al. ................................ | 348/6 |
| 4,935,924 | 6/1990 | Baxter .......................................... | 348/8 |
| 5,010,400 | 4/1991 | Oto ............................................. | 348/11 |
| 5,014,349 | 5/1991 | Kubo et al. ................................ | 455/6.2 |
| 5,136,411 | 8/1992 | Paik et al. ................................... | 455/6.1 |
| 5,194,947 | 3/1993 | Lowcock et al. ............................ | 348/6 |
| 5,276,904 | 1/1994 | Mutzig et al. ............................ | 455/6.2 |
| 5,382,971 | 1/1995 | Chanteau . | |
| 5,467,384 | 11/1995 | Skinner ..................................... | 455/3.3 |
| 5,581,801 | 12/1996 | Spreister et al. ............................. | 348/6 |
| 5,642,155 | 6/1997 | Cheng ........................................... | 348/7 |
| 5,670,902 | 9/1997 | Nakagawa et al. ....................... | 455/3.1 |

FOREIGN PATENT DOCUMENTS

| | | | |
|---|---|---|---|
| 0583843 | 5/1991 | European Pat. Off. . | |
| 002662895 | 12/1991 | France ....................................... | 348/8 |
| WO 9106159 | 2/1994 | WIPO . | |

OTHER PUBLICATIONS (Thomas & Rosa, Circuits and Signals: An Introduction to Linear and Interface Circuits, 92 & 98–99), 1984.

*Primary Examiner*—Andrew I. Faile
*Assistant Examiner*—Reuben M. Brown
*Attorney, Agent, or Firm*—Leroy Eason

[57] ABSTRACT

A television signal distribution network includes respective distributor cables for signals from respective satellite antennas, one of such cables also being coupled to a terrestrial signal source and serving as a dual distribution cable for both satellite and terrestrial signals. A switching unit permits each user terminal to be selectively connected to any of the distributor cables for reception of a selected satellite signal. The user terminals are also all coupled to the dual cable via a filter which only passes the terrestrial signal band, whereby the terrestrial signal is distributed to all terminals from only a single cable, independently of the setting of the switching unit. Another of the distributor cables also serves as a return cable for upstream signals from the user terminals. The return path includes a filter which only passes an upstream frequency band below that of the terrestrial and satellite signals.

10 Claims, 2 Drawing Sheets

TELEVISION SIGNAL CABLE DISTRIBUTION INSTALLATION

BACKGROUND OF THE INVENTION

1. Field of the Invention

The invention relates to a television signal cable distribution network comprising a plurality of distributor cables conveying a plurality of satellite signals which are possibly different from cable to cable, a service device for supplying signals to a user terminal, tapping units for tapping each cable for signals from such cable, and a switch for connection of the user terminal to a selected one of the tapping units.

The invention also relates to the aforesaid service device of such a television signal cable distribution network.

2. Description of the Related Art

A television signal cable distribution network of the type described in the opening paragraph is known from U.S. Pat. No. 5,382,971 issued Jan. 17, 1995 to the present inventor and assigned to the present assignee. In the network described in this document, the signals received from terrestrial stations are added in each cable to the signals received via satellite. This is an ingenious way of enabling each user to receive the terrestrial channels without being obliged to choose a particular cable from among the plurality of cables, but it has the drawback that the cables are heavily loaded, which reduces the possibilities of the system and, inter alia, increases intermodulation in amplifiers.

SUMMARY OF THE INVENTION

It is an object of the invention to provide a network which obviates these drawbacks and which particularly permits introduction of upstream information without adding cables.

To this end, in a network for distributing television signals via several cables, one of the cables, referred to as "dual" cable conveys, in addition to satellite signals, the assembly of signals from terrestrial stations. The service device comprises a first low-pass filter having a cut-off frequency between the frequency range of signals from terrestrial stations and the frequency range of satellite signals. Such filter has an input which is connected to a tapping unit for tapping the signals of the dual cable, and an output which is permanently connected to the user terminal.

The invention is thus based on the idea of distributing the terrestrial signals to all terminals from a single cable, independently of the position of the switch for selecting one of the cables.

With a single cable conveying the terrestrial channels, a passband remains available in the other cables. It is thus possible to transmit upstream signals having frequencies which are below the frequency range of signals from terrestrial stations, which upstream signals are conveyed by one of the cables referred to as "return path" cable, which is not the dual cable, and the service device comprises a second low-pass filter having an input which is permanently connected to the user terminals and an output which is connected to the return path cable, this second low-pass filter having a cut-off frequency which is between the frequency range of upstream signals and the frequency range of the satellite signals.

The cables are thus, as it were, specialized and it is therefore possible to obtain a network in a very economical manner, enabling introduction of upstream information, while high-performance filters are not necessary.

To feed different active circuits in the service devices, the network preferably comprises at least three cables, one of which, which is neither the dual cable nor the return path cable, conveys a power supply voltage.

Advantageously, an amplifier is arranged in series with the first low-pass filter.

The level of the signal at the user terminal can thus be controlled at any desired value.

Advantageously, a first high-pass filter having a cut-off frequency between the frequency range of signals from terrestrial stations and the frequency range of satellite signals is arranged between the tapping unit intended for tapping the signals of the dual cable and the switch.

The mixture of terrestrial signals with satellite signals is thus avoided in the switch.

Advantageously, a second high-pass filter having a cut-off frequency between the frequency range of the upstream signals and the frequency range of the satellite signals is arranged between the tapping unit intended for tapping the signals of the return path cable, and the switch.

The mixture of signals from the return path with the satellite signals is thus avoided in the switch.

The service device preferably comprises a third high-pass filter having a cut-off frequency between the frequency range of the upstream signals and the frequency range of signals from terrestrial stations, which high-pass filter is arranged in the connection between the user terminal and the dual cable on the side of the user terminal.

The perturbation of terrestrial channels by signals intended for the return path is thus avoided.

The service device is preferably provided with a plurality of user terminals and comprises as many switches as there are user terminals, each switch allowing connection of one of the user terminals optionally to one of the tapping units, and a splitter which supplies the signals filtered by the first low-pass filter to all the terminals at a time.

In this case, the input of the second low-pass filter is connected to each user terminal.

The return path is thus accessible, independent of the terminal chosen.

In a preferred embodiment, the input of the second low-pass filter is connected to each user terminal via a summing device comprising resistors.

Such a summing device is simple and economical.

The splitter advantageously comprises resistors which constitute both the splitter and the summing device, the common input of the splitter also being the output of the summing device.

The combination of these two means is an economical solution.

These and other aspects of the invention will be apparent from and elucidated with reference to the embodiments described hereinafter.

DETAILED DESCRIPTION OF THE PREFERRED EMBODIMENTS

Figure 1:
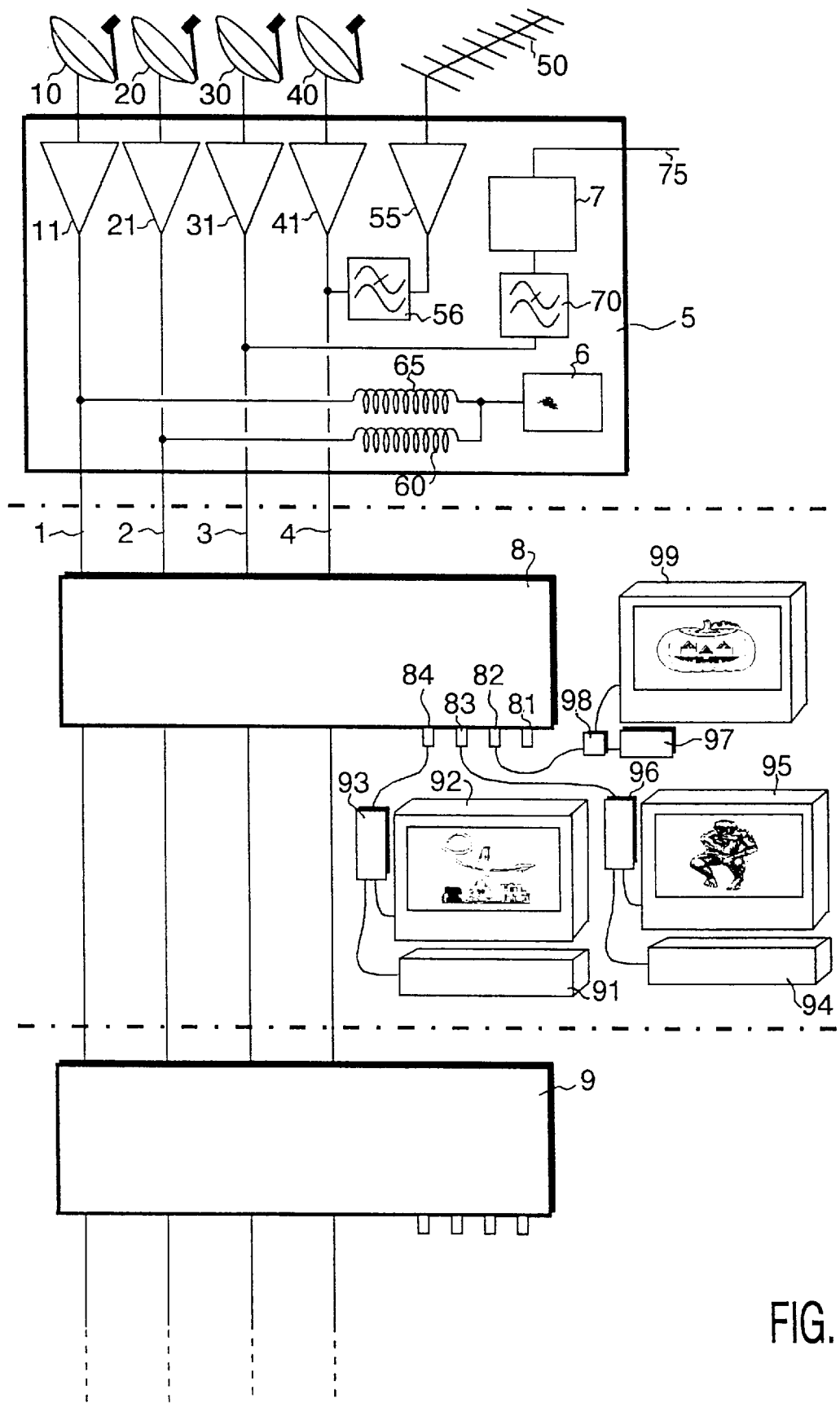
FIG. 1 shows diagrammatically a television signal cable distribution network, with a network head-end, distributor cables, several service devices and user installations.

The television signal cable distribution network shown in FIG. 1 has a network head-end 5. Here, for example, it is equipped with four parabolic antennas 10, 20, 30, 40 for receiving satellite signals, and an antenna 50 for receiving signals from terrestrial stations. Each satellite reception parabola is associated with a low-noise amplifier and frequency converter block 11, 21, 31, 41, generally referred to as "LNB", supplying the signals in a frequency range between 950 and 2150 MHz. Each of these signals is applied to a different distributor cable 1, 2, 3, 4. A sufficient number of channels may also be supplied by parabolas in a number smaller than four, in which case the channels are then distributed by a splitter through the four distributor cables.

The signals from the terrestrial antenna 50 are amplified by an amplifier 55 covering a frequency range between 45 and 862 MHz and are applied to the distributor cable 4 via a low-pass filter 56 having a cut-off frequency of the order of 900 MHz, i.e. between the frequency range of signals from terrestrial stations and the frequency range of satellite signals. The distributor cable 4 will hereinafter be referred to as "dual" cable because it conveys satellite signals as well as signals from terrestrial stations.

The distributor cable 3 is intended for transmitting upstream signals, i.e. signals returning from the users; this distributor cable 3 will hereinafter be referred to as "return" cable. The return signals have frequencies in a range between, for example, 5 and 30 MHz, which is well below the frequency range of signals from terrestrial stations. The return signals are transmitted via a low-pass filter 70 to a known device 7 for controlling upstream messages transmitted, for example, through a telephone line 75. A transmission of the return path by a transmitter directed towards a satellite is also envisageable. The low-pass filter 70 has a cut-off frequency of the order of 35 MHz, i.e. it is above the frequency range of upstream signals and well below the frequency range of satellite signals. This filter may have a higher frequency, up to the order of 860 MHz.

A power supply unit 6 supplies a DC power supply voltage intended for different active components of the service device through each distributor cable 1 and 2, via inductances 65 and 60. The power supply of the "LNB", which is not shown so as not to complicate the Figure, is provided by the power supply unit 6 directly within the network head-end 5 without passing through the distributor cables.

The distributor cables 1–4 serve, for example, an apartment building, and the dot-and-dash lines symbolize the different floors. The lodgings on one and the same floor, for example four lodgings, are served by the same service device 8 or 9. Such a device will hereinafter be described in greater detail. It has four connectors 81, 82, 83, 84 each intended to serve a receiver assembly and supplies, on each of these connectors, the assembly of signals from terrestrial stations in addition to one of the satellite signals.

A first receiver assembly comprises, for example a known unit 93 which is provided with filters for supplying the satellite signals to a receiver decoder 91 and the signals from terrestrial stations to a television receiver 92; this unit also passes the DC current or the low-frequency current. The receiver decoder 91 is equipped with known means enabling a user to communicate messages by means of appropriate keys, and means for transmitting sequences of digital codes through the lead connected to the unit 93, which codes represent said messages and are modulated in the frequency range between, for example 5 and 30 MHz. A second receiver assembly comprises analog elements 96, 94, 95. A third receiver assembly comprises a television set 99 without a receiver decoder. A dialogue unit 97 is connected by means of a connection unit 98 to the lead which connects the television set to the service device 8. This dialogue unit comprises means enabling a user to send out messages, analogous to those of the receiver decoder 91. Each receiver decoder 91 and 94 also comprises a known control voltage generator which generates, on the cable connecting it to the terminals 84 and 83, for example, a voltage of 14 volts for selecting the distributor cable 1, of 18 volts for selecting the distributor cable 2, of 14 volts with superposition of an AC voltage of 22 kHz for selecting the distributor cable 3, and of 18 volts with superposition of an AC voltage of 22 kHz for selecting the distributor cable 4. This also holds for the control unit 97. The three assemblies are shown side by side so as to simplify the drawing, but it will be evident that they are generally situated in different lodgings.

Figure 2:
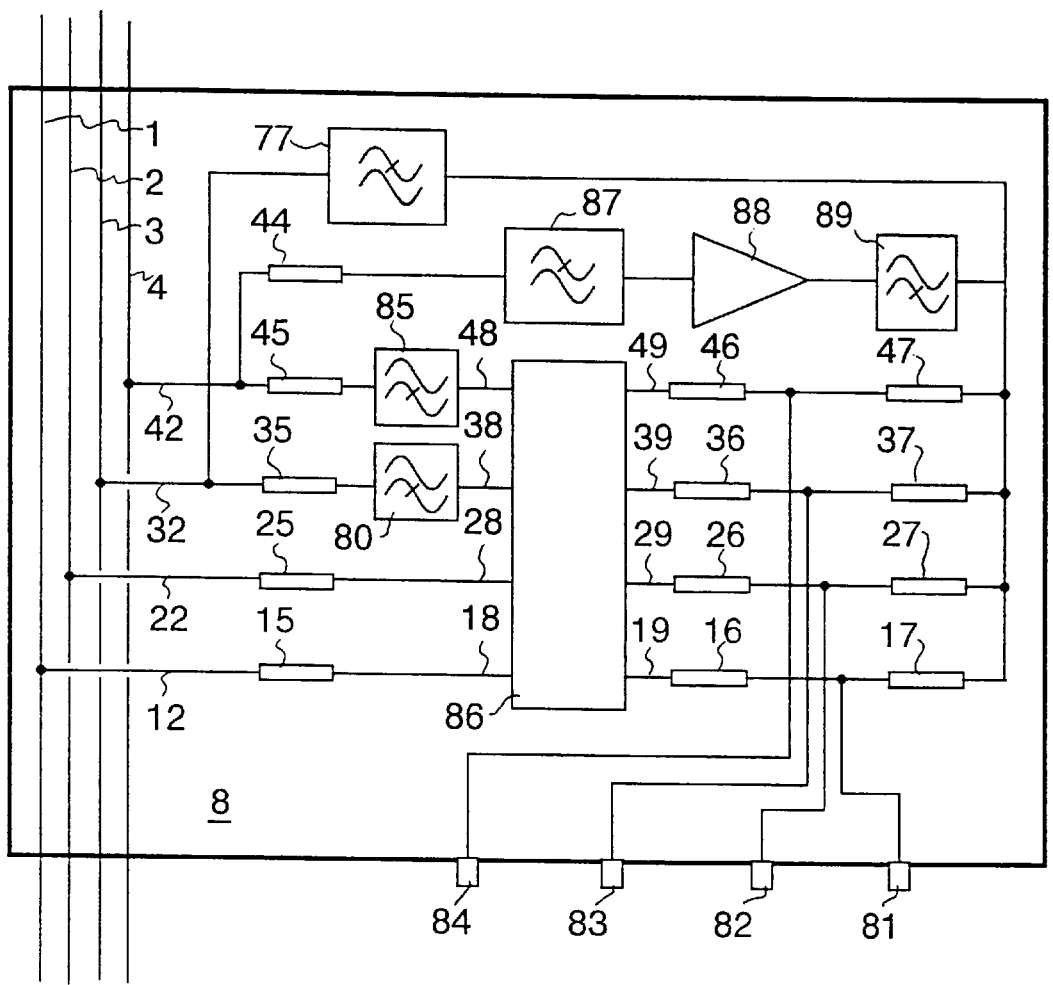
FIG. 2 shows diagrammatically a service device.

The service device is shown in FIG. 2 comprises the four user terminals 81, 82, 83, 84 for supplying signals to a user, and as many tapping units as there are cables, i.e. four tapping units in this case for tapping, for each cable, signals corresponding to the plurality of signals from this cable. A tapping unit is a known circuit: to realize this circuit, a choice can be made, notably between a resistance tapping unit, which is most economical, but not directive and reduces the level of the signal, or a tapping unit with coupled lines and which is directive but does not always have a sufficiently flat response, or a tapping unit which is a ferrite transformer unit; any of these known tapping units may be suitably used in the present application. The tapping units shown in FIG. 2 are simple resistors 15, 25, 35, 45 which tap the signal from through-connections of the distributor cables 1–4 via the service device. Each resistor 15, 25, 35, 45 is connected to an input 18, 28, 38, 48 of a switching unit 86 which will hereinafter be described in greater detail and with which each user terminal 81–84 can be optionally connected to one of the tapping units. The resistors 16, 26, 36 and connect the outputs 19 to 49 of the switching unit 86 to the user terminals 81–84, respectively.

The dual cable 4 is connected via a tapping unit constituted by a resistor 44 to a first low-pass filter 87 having a cut-off frequency of the order of 900 MHz, i.e. between the frequency range of signals from terrestrial stations and the frequency range of signals from satellites. The output of this filter 87 is permanently connected via an amplifier 88 and another filter 89, to be described hereinafter, to the four user terminals 81–84 via four resistors arranged in fan configuration 17, 27, 37, 47, respectively. These resistors constitute a splitter supplying the filtered signals via the first low-pass filter 87 to all the terminals 81–84 at a time.

The service device also comprises means for connecting the user terminals permanently to the return path cable 3. These means are constituted by the four resistors 17, 27, 37, 47 already mentioned above which now constitute a summing device whose common point, at the right in the Figure, is connected to the return path cable 3 via a second low-pass filter 77. It has a cut-off frequency of the order of 35 MHz, i.e. it is above the frequency range of upstream signals and well below the frequency range of satellite signals. It will be noted that the resistance splitter distributing the signals from the amplifier 88, and the resistance summing device adding the signals from the user terminals to the input of the filter 77 are constituted in practice by the same resistors 17, 27, 37, 47, while the input of the splitter is also the output of the summing device.

A first high-pass filter 85, which has a cut-off frequency of the order of 900 MHz, i.e. between the frequency range of signals from terrestrial stations and the frequency range of satellite signals, is arranged between the tapping unit 45 for tapping the signals of the dual cable 4 and the input 48 of the switching unit 86.

A second high-pass filter 80, which has a cut-off frequency of the order of 35 MHz, i.e. above the frequency range of upstream signals and below the frequency range of satellite signals, is arranged between the tapping unit 35 for tapping the signals of the return path cable 3 and the input 38 of the switching unit 86.

The filter 89, which is arranged between the user terminals and the dual cable, more particularly between the common point of the splitter comprising resistors 17, 27, 37, 47 and the output of the amplifier 88, is a high-pass filter which has a cut-off frequency of the order of 35 MHz, i.e. between the frequency range of upstream signals and the frequency range of signals from terrestrial stations.

Figure 3:
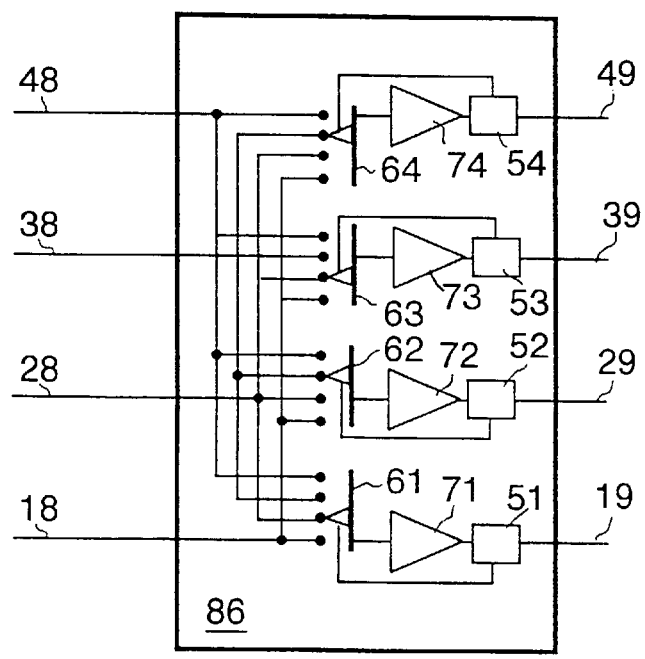
FIG. 3 shows diagrammatically a switching unit.

The switching unit 86 is shown in detail in FIG. 3. Each input connection 18, 28, 38, 48 is connected to one of the four "contacts" (symbolical contacts, because an electronic switch is used in practice) for each switch 61, 62, 63, 64. Each contact "finger" (also symbolical) is connected to input of an amplifier 71, 72, 73, 74 feeding an output 19, 29, 39, 49, respectively. Control receivers 51, 52, 53, 54 decode the DC voltages of 14 or 18 volts and/or the AC voltage at 22 kHz, as mentioned above, for controlling the position of the relevant switch and connecting the user terminal to the selected tapping unit.

I claim:

1. A television signal cable distribution network comprising: a plurality of distributor cables each of which conveys a respective satellite antenna signal; and a service device having one or more user terminals to which said service device supplies television signals;

a plurality of tapping units for tapping the signals on the respective distributor cables; and a switching unit for connecting respective ones of the user terminals to selected ones of the tapping units for respective ones of the distributor cables;

characterized in that:

(a) a single one of the distributor cables serves as a dual cable which also conveys an assembly of terrestrial signals from one or more terrestrial sources, the terrestrial signals being in a lower frequency range than the satellite signals; and (b) the service device comprises a low-pass filter having a cut-off frequency above the frequency range of the terrestrial signals and below the frequency range of the satellite signals, which filter has an input coupled to said dual cable and an output coupled to a common connection to each of said user terminals.

2. A distribution network as claimed in claim 1, wherein one of the distributor cables other than the dual cable serves as a return path cable which also conveys upstream signals from the user terminals, the upstream signals having a frequency range below that of the terrestrial signals; and the service device comprises common connection means for coupling each of the user terminals to said return path cable.

3. A distribution network as claimed in claim 2, wherein one of the distributor cables other than the dual cable and the return path cable conveys a power supply voltage to said service device.

4. A service device for use in a television signal distribution network having a plurality of distributor cables each of which conveys a respective satellite antenna signal, a single one of which distributor cables serves as a dual cable which also conveys an assembly of terrestrial signals from one or more terrestrial sources, the terrestrial signals being in a lower frequency range than the satellite signals; said service device comprising:

one or more user terminals to which said service device supplies television signals;

a plurality of tapping units for tapping the signals on the respective distributor cables;

a switching unit for connecting respective ones of the user terminals to selected ones of the tapping units for the distributor cables; and a first low-pass filter having a cut-off frequency above the frequency range of the terrestrial signals and below the frequency range of the satellite signals, which filter has an input coupled to said dual cable and an output coupled to a common connection to each of said user terminals.

5. A service device as claimed in claim 4, further comprising a first high-pass filter having a cut-off frequency above the frequency range of the terrestrial signals and below the frequency range of the satellite signals, and having an input coupled to the tapping unit for the dual cable and an output coupled to said switching unit.

6. A service device as claimed in claim 4, wherein one of the distributor cables other than the dual cable serves as a return path cable which also conveys upstream signals from the user terminals, the upstream signals having a frequency range below that of the terrestrial signals; and further comprising a second low-pass filter coupled between the return path cable and the common connection to each of the user terminals, said second low-pass filter having a cut-off frequency above the frequency range of the upstream signals and below the frequency range of the satellite signals.

7. A service device as claimed in claim 6, further comprising a second high-pass filter having a cut-off frequency above the frequency range of the upstream signals and below the frequency range of the satellite signals, and which is coupled between the tapping unit for the return path cable and said switching unit.

8. A service device as claimed in claim 7, further comprising a third high-pass filter having a cut-off frequency above the frequency range of the upstream signals and below the frequency range of the terrestrial signals, and coupled between the first low-pass filter and the common connection to each of the user terminals.

9. A service device as claimed in claim 4, further comprising a splitter arrangement for supplying signals filtered by the first low-pass filter to all of the user terminals at a time.

10. A service device as claimed in claim 6, further comprising a splitter arrangement for supplying signals filtered by the first low-pass filter to all of the user terminals at a time, and wherein said common connection to each of the user terminals is provided by a resistive summing device which also serves as said splitter arrangement.

* * * * *